United States Patent [19]

Hisgen et al.

[11] Patent Number: 4,788,272
[45] Date of Patent: Nov. 29, 1988

[54] WHOLLY AROMATIC MESOMORPHIC POLYESTER AMIDE IMIDES AND THE PREPARATION THEREOF

[75] Inventors: Bernd Hisgen, Limburgerhof; Michael Portugall, Wachenheim; Rolf Steinberger, Schifferstadt, all of Fed. Rep. of Germany

[73] Assignee: BASF Aktiengesellschaft, Ludwigshafen, Fed. Rep. of Germany

[21] Appl. No.: 938,057

[22] Filed: Dec. 4, 1986

[30] Foreign Application Priority Data

Dec. 4, 1985 [DE]  Fed. Rep. of Germany ....... 3542796

[51] Int. Cl.$^4$ ........................................... C08G 73/16
[52] U.S. Cl. .................................... 528/170; 528/271; 528/125; 528/172; 528/183; 528/184; 528/190; 528/193
[58] Field of Search ................................... 528/170

[56] References Cited

U.S. PATENT DOCUMENTS

| | | | |
|---|---|---|---|
| 3,461,136 | 8/1969 | Pruckmayr | 528/183 |
| 3,859,251 | 1/1975 | Kuhfuss | 528/183 |
| 4,118,372 | 10/1978 | Schaefgen | 528/190 |
| 4,176,223 | 10/1979 | Irwin | 528/170 |
| 4,375,530 | 3/1983 | Hay et al. | 524/605 |
| 4,383,105 | 5/1983 | Irwin | 528/170 |
| 4,564,669 | 1/1986 | Dicke et al. | 528/173 |
| 4,727,129 | 2/1988 | Hisgen et al. | 528/171 |

FOREIGN PATENT DOCUMENTS 81900 10/1982 United Kingdom ................ 528/172

*Primary Examiner*—John Kight
*Assistant Examiner*—Frederick Krass
*Attorney, Agent, or Firm*—Keil & Weinkauf

[57] ABSTRACT

Wholly aromatic mesomorphic polyester amide imides which form a liquid-crystalline fiber-forming melt below 320° C. and are composed of
(a) from 5 to 35 mole % of repeat units of the formula I and/or II

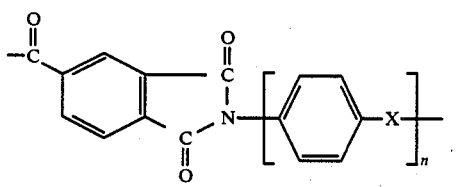

I

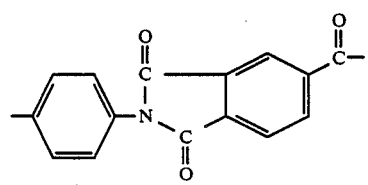

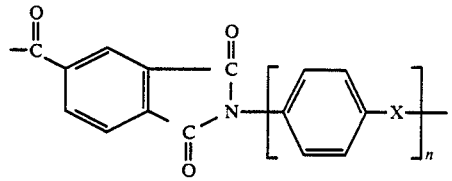

II

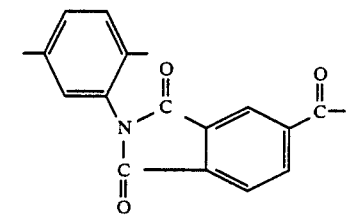

where the Xs in the formulae I and II can be identical or different and each is —O—, —S—, —SO$_2$—, —CO—, —CH$_2$—or =C(CH$_3$)$_2$ and n is 0 or 1,
(b) from 0 to 30 mole % of repeat units of the formulae III and/or IV

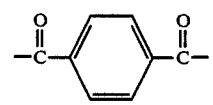

III

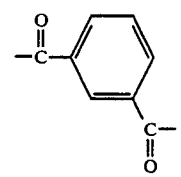

IV (c) a molar amount corresponding to the total amount of components a and b of one or more of the repeat units of the formulae V, VI, VII, VIII and IX

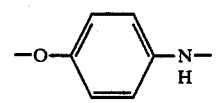

V

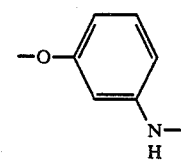

VI

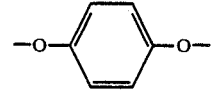

VII (Abstract continued on next page.)

-continued
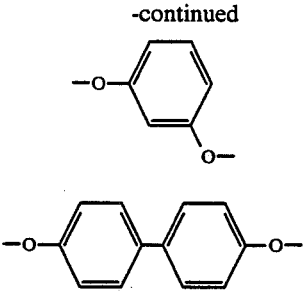
VIII
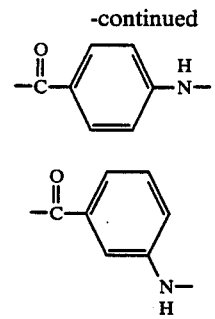
XI
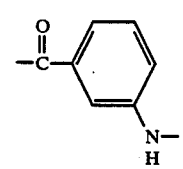
XII
(e) repeat units of the formula XIII
IX
(d) if desired from 5 to 25 mole % of one or more of the repeat units of the formulae X, XI and XII
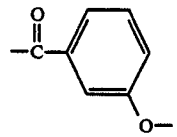
X
XIII
the mole percentages of components (a), (b), (c), (d) and (e) adding up to 100 mole % in each case,
the preparation thereof and fibers, films and moldings prepared therefrom.
10 Claims, No Drawings

WHOLLY AROMATIC MESOMORPHIC POLYESTER AMIDE IMIDES AND THE PREPARATION THEREOF

The present invention relates to wholly aromatic mesomorphic polyester amide imides which form a liquid-crystalline fiber-forming melt below 320° C.

Liquid-crystalline polyester amides and polyester imides are known. However, these polymers are in need of improvement in heat distortion resistance, processability and, in particular, abrasion resistance. EP Application No. 81,900 discloses polyester amides which comprise 40% or more coaxial units such as aromatic dicarboxylic acids, hydroxybenzenecarboxylic acids, bisphenols and aminophenols and contain an adequate amount of nonlinear radicals which are derived from aromatic m-amino compounds and 2-nuclear aromatic sulfones, but does not reveal the composition required to obtain the desired combination of properties. U.S. Pat. No. 4,176,223 describes polyester imides which are based on naphthalenedicarboxylic acid, substituted hydroquinones and 4-(4'-carboxyphthalimido)benzoic acid. However, these polymers require for processing from the melt temperatures of 330° C. or more. The same is true of the polyester imides known from U.S. Pat. No. 4,383,105, which are based on hydroxynaphthalenecarboxylic acid, terephthalic acid, p-hydroxybenzoic acid and 4-(4'- hydroxyphthalimido)phenol.

It is an object of the present invention to provide wholly aromatic mesomorphic polyester amide imides which form a liquid-crystalline fiber-forming melt below 320° C. and thus are easy to process and, in addition, have a high heat distortion resistance, a high abrasion resistance and a high resilience.

We have found that this object is achieved with wholly aromatic mesomorphic polyester amide imides which form a liquid-crystalline fiber-forming melt below 320° C. and are composed of (a) from 5 to 35 mole % of repeat units of the formula I and/or II

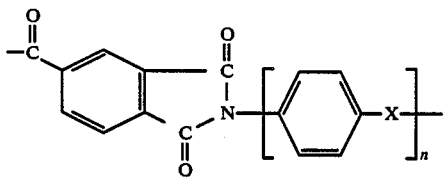

I

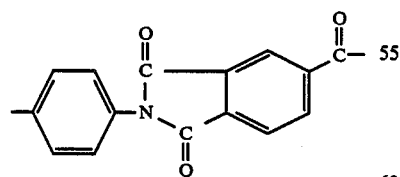

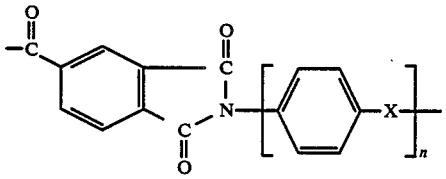

II

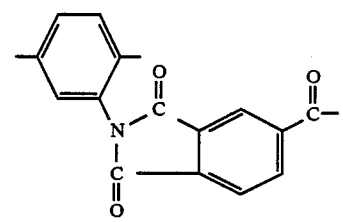

where the Xs in the formulae I and II can be identical or different and each is —O—, —S—, —SO$_2$—, —CO—, —CH$_2$—or —C(CH$_3$)$_2$ and n is 0 or 1, (b) from 0 to 30 mole % of repeat units of the formulae III and/or IV

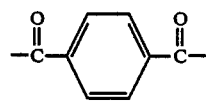

III

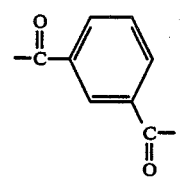

IV (c) a molar amount corresponding to the total amount of components a and b of one or more of the repeat units of the formulae V, VI, VII, VIII and IX

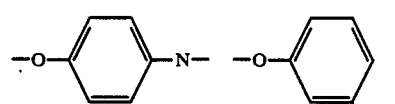

V    VI

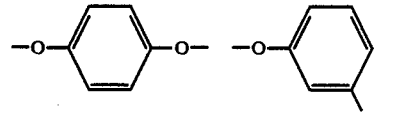

VII    VIII

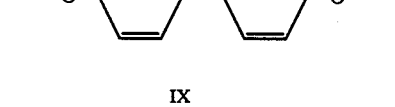

IX (d) if desired from 5 to 25 mole % of one or more of the repeat units of the formulae X, XI and XII

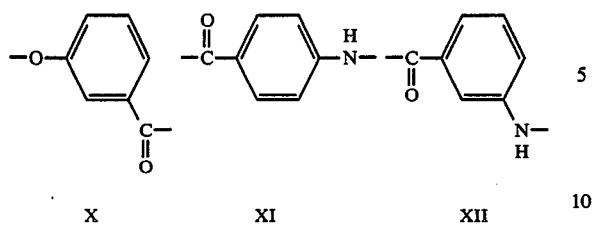

X        XI        XII (e) repeat units of the formula XIII

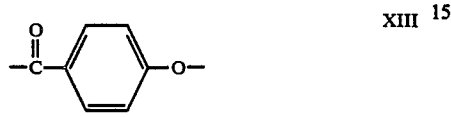

XIII mole percentages of components, (a), (b), (c), (d) and (e) adding up to 100 mole % in each case.

The novel wholly aromatic polyester amide imides have the advantage of combining a high heat distortion resistance with a smooth abrasion-resistant surface. The novel polyester amide imides further have high stiffness, strength and resilience. In addition, they are substantially resistant to chemicals and of low flammability and can be processed from the melt at below 320° C.

The liquid-crystalline state of the polyester amide imides can be detected with a polarization microscope by a method described in German Published Application DAS No. 2,520,819. Applied in a thickness of 10 μm between glass plates and viewed between crossed polarizers, the polymer melts have textures which can be ascribed to a mesomorphic phase.

The polyester amide imides according to the invention are composed of (a) from 5 to 35 mole %, in particular from 7 to 25 mole %, of repeat units of the formulae I and/or II

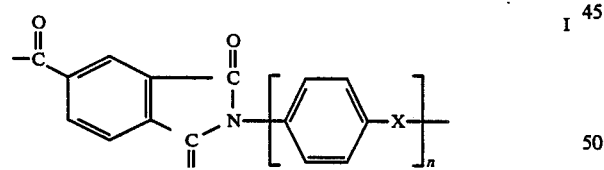

I

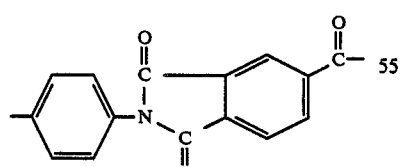

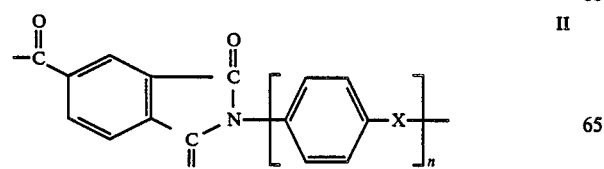

II

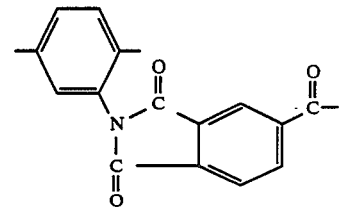

where the Xs in the formulae I and II can be identical or different and each is —O—, —S—, —SO₂—, —CO—, —CH₂— or =C(CH₃)₂, in particular —O—, —SO₂— or —CH₂—, and n is 0 or 1, suitable compounds being for example 4,4'-bis[(4-carboxy)-N-phthalimido]diphenyl ether, 4,4'-bis[(4-carboxy)-N-phthalimido]diphenyl methane, 4,4'-bis[(4-carboxy)-N-phthalimido]diphenyl sulfone, 4,4'-bis[(4-carboxy)-N-phthalimido]diphenyl sulfide, 4,4'-bis[(4-carboxy)-N-phthalimido]diphenyl ketone, 3,4'-bis[(4-carboxy)-N-phthalimido]diphenyl ether, 3,4'-bis[(4-carboxy)-N-phthalimido]diphenyl sulfide, 3,4'-bis[(4-carboxy)-N-phthalimido]diphenyl sulfone, 3,4'-bis[(4-carboxy)-N-phthalimido]diphenyl ketone and 3,4'-bis[(4-carboxy)- N-phthalimido]diphenylmethane.

(Compounds of the formulae I and II are obtainable for example by the method of J. Polym. Sci. (A-1) 7 (1969), 32–332.)

(b) from 0 to 30 mole %, in particular from 0 to 20 mole %, of repeat units of the formulae III and/or IV

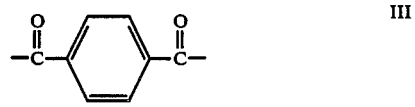

III

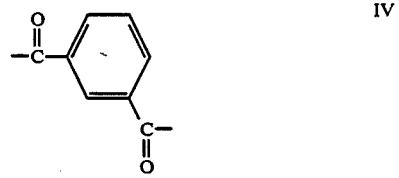

IV suitable starting compounds being for example terephthalic acid and isophthalic acid, (c) a molar amount corresponding to the total amount of components (a) and (b) of one or more of the repeat units of the formulae V, VI, VII, VIII and IX

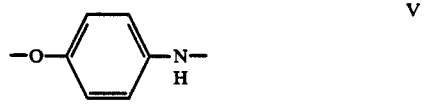

V

VI

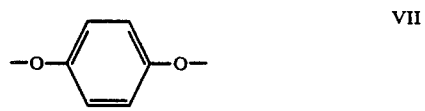

VII

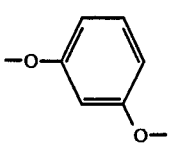

VIII

IX suitable starting materials being for example p-aminophenol for units of the formula V, m-aminophenol for units of the formula VI, hydroquinone for units of the formula VII, resorcinol for units of the formula VIII and 4,4'-dihydroxybiphenyl for units of the formula IX, (d) if desired from 5 to 25 mole %, in particular from 5 to 20 mole %, of one or more of the repeat units of the formulae X, XI and XII

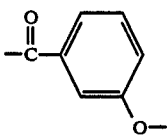

X

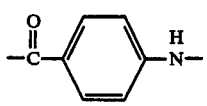

XI

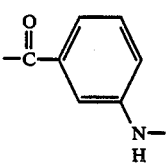

XII suitable starting materials being for example m-hydroxybenzoic acid for units of the formula X, p-aminobenzoic acid for units of the formula XI and m-aminobenzoic acid for units of the formula XII, (e) repeat units, in particular in an amount of not less than 10 mole %, of the formula XIII

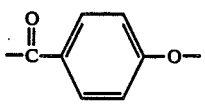

XIII a suitable starting compound being for example p-hydroxybenzoic acid. It will be readily understood that the mole percentages of components (a), (b), (c), (d) and (e) add up to 100 mole % in each case.

Advantageously the polyester amide imides according to the invention contain as component (c) from 5 to 20 mole % of repeat units of the formula VI and/or from 2 to 8 mole % of repeat units of the formula V and/or from 5 to 20 mole % of one or more of the repeat units of the formula VII, VIII or IX.

Particular preference is given to polyester amide imides which contain as component (c) from 5 to 20 mole % of repeat units of the formula VI, from 5 to 15 mole % of repeat units of the formula VII and from 5 to 15 mole % of repeat units of the formula IX.

Other preferred polyester amide imides contain as component (c) from 5 to 20 mole % of repeat units of the formula VI and from 5 to 15 mole % of repeat units of the formula VII.

Preferred wholly aromatic polyester amide imides according to the invention have a glass transition temperature of $\geq 140°$ C., in particular $\geq 150°$ C. The glass transition temperature is measured by the DSC differential scanning colorimetry method as described by K. H. Illers et al. in Makromol. Chemie 127 (1969), 1 ff. The wholly aromatic liquid-crystalline polyester amide imides of the invention form a liquid-crystalline fiber-forming melt at below 320° C. Preference is also given to liquid-crystalline aromatic polyester amide imides which have partial crystallinity at a temperature $>200°$ C. and $<300°$ C.

The liquid-crystalline polyester amide imides according to the invention are obtained in a manner similar to techniques as described for example in U.S. Pat. Nos. 4,375,530 and 4,118,372.

In an advantageous embodiment, the polyester amide imides according to the invention are obtained in a single-stage process by converting the starting materials as underivatized carboxylic acids, hydroxy compounds or amino compounds using anhydrides of lower fatty acids, for example fatty acids of 2 to 4 carbon atoms, in particular acetic anhydride. This conversion may also be catalyzed with catalysts of the type described for example in EP-A-131,846 (page 9), used in an amount of from 0.001 to 1% by weight. In the preferred embodiment, the starting materials are heated together with a fatty acid anhydride, which is advantageously present in a molar excess of 5% or more, based on the hydroxyl and amino groups present, with stirring in an inert gas atmosphere to a temperature at which reflux occurs. Advantageously the temperature is raised in stages, for example to 130° to 200° C. in not more than 5 hours, preferably up to 2 hours, and the temperature is then raised to 250°–350° C., for example in the course of from 2 to 2½ hours, during which excess fatty acid anhydrides and fatty acids are distilled off. To complete the reaction it has been found to be advantageous to employ reduced pressure, for example from 200 to 0.1 mbar, toward the end.

The wholly aromatic liquid-crystalline polyester amide imides thus obtained can subsequently be further condensed in the solid state, for example at 150°–250° C. in the solid phase below the melting point, until the desired viscosity is obtained. This postcondensation in solid phase can be carried out not only before but also after thermoplastic processing. Advantageously the condensation in solid phase is carried out in the presence of inert gases, for example nitrogen.

It is a remarkable and unforeseeable feature of this single-stage process that the desired polymers are obtained in a relatively short time in a trouble-free and complete reaction without catalysts. This is all the more remarkable as the large number of chemically different hydroxyl and amino groups would have been expected to lead to differences in reactivity and hence inadequate polymer synthesis.

The polyester amide imides according to the invention can contain customary additives such as stabilizers, oxidation inhibitors, agents against thermal decomposition and decomposition by ultraviolet light, lubricants, mold release agents, colorants such as dyes and pigments, fibrous and pulverulent fillers and reinforcing agents, plasticizers and nucleating agents in conventional active amounts.

The stabilizers can be added to the polymers at any stage of processing or when complete. Preferably the stabilizers are added early on to prevent the onset of decomposition before the polymers are protected.

Suitable oxidation inhibitors and heat stabilizers are for example halides of metals of group I of the periodic table, for example of sodium, potassium, lithium with copper(I) halides, for example chloride, bromide or iodide, and also sterically hindered phenols, hydroquinones, various substituted representatives of these groups and combinations thereof, in concentrations up to 1% by weight, based on the polymer.

Suitable UV stabilizers which are employed in amounts of up to 2% by weight, based on the composition, are for example substituted resorcinols, salicylates, benzotriazoles or benzophenones.

Further additives are for example organic dyes such as nigrosine or pigments such as titanium dioxide, cadmium sulfide, cadmium selenide, phthalocyanines, ultramarine blue or carbon black, which are employed for example in amounts of up to 5% by weight, based on the polymer.

Further suitable additives are fibrous or pulverulent fillers and reinforcing agents such as carbon fibers, glass fibers, amorphous silica, asbestos, calcium silicate, aluminum silicate, magnesium carbonate, kaolin, feldspar, chalk, quartz powder or mica, for example in amounts of up to 70% by weight of the polymer.

Other suitable additives are nucleating agents such as talcum, calcium fluoride, sodium phenylphosphinate, aluminum oxide or finely divided polytetrafluoroethylene.

Suitable additives are also plasticizers, for example in amounts of up to 20% by weight of the polymer, for example dioctyl phthalate, dibenzyl phthalate, butyl benzyl phthalate, hydrocarbon oils, N-n-butylbenzenesulfonamide, and o- and p-tolueneethylsulfonamide.

The wholly aromatic liquid-crystalline polyester amide imides according to the invention are suitable for preparing filaments, fibers, films, foams and industrial moldings by injection molding, pressing or extruding. The moldings prepared from the polyester amide imides according to the invention have excellent mechanical properties such as stiffness, strength and resilience. They are extremely resistant to chemicals and of low flammability. They also have a high heat distortion resistance and a smooth, abrasion-resistant surface. The polyester amide imides according to the invention are therefore highly suitable for preparing articles for electrical engineering, data processing, automotive construction and other industrial sectors. But they can also be used as coating materials, for example in the form of a pulverulent dispersion or as a film.

The invention is illustrated by the following examples.

EXAMPLE 1

0.15 mol of terephthalic acid, 0.26 mol of 4-hydroxybenzoic acid, 0.07 mol of hydroquinone, 0.07 mol of dihydroxybiphenyl, 0.06 mol of 3-aminophenol and 0.05 mol of the compound

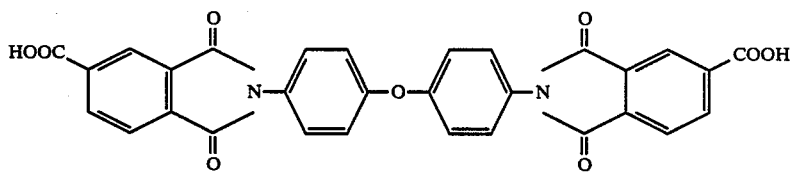

and 84 ml of acetic anhydride are heated with stirring under nitrogen from 150° C. to 300° C. in the course of 3 h, while excess acetic anhydride and acetic acid is distilled off. The pressure is then reduced to 240 mbar in the course of 1 h 15 min to give a viscous fiber-forming melt. The polymer melt and the cold polymer have a pearlescent luster. The polymer has a smooth, hard and abrasion-resistant surface. DSC differential scanning colorimetry measurements indicate a glass transition temperature of 150° C. and a melting point of 260° C. The intrinsic viscosity is 1.00 dl/g, measured at 60° C. in 0.1% strength (wt./vol.) solution in pentafluorophenol.

EXAMPLE 2

0.10 mol of terephthalic acid, 0.26 mol of 4-hydroxybenzoic acid, 0.07 mol of hydroquinone, 0.03 mol of dihydroxybiphenyl, 0.10 mol of 3-aminophenol and 0.1 mol of the compound

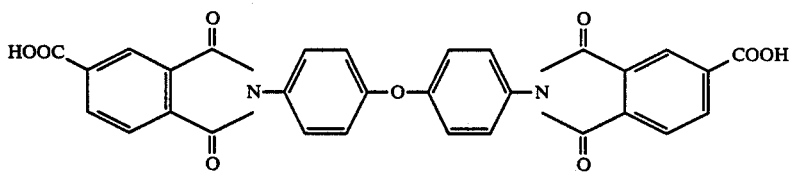

and 84 ml of acetic anhydride are heated with stirring under nitrogen from 150° C. to 300° C. in the course of 2 h 45 min, while excess acetic anhydride and acetic acid is distilled off. The pressure is then reduced to 80 mbar in the course of 50 min to give a viscous, pale, fiber-forming melt. The polymer melt and the cold polymer have a pearlescent luster. The polymer has a smooth, hard and abrasion-resistant surface. DSC differential scanning colorimetry measurements indicate a glass transition temperature of 177° C. The intrinsic viscosity is 0.82 dl/g, measured at 60° C. in 0.1% strength (wt./vol.) solution in pentafluorophenol.

EXAMPLE 3

0.085 mol of terephthalic acid, 0.22 mol of 4-hydroxybenzoic acid, 0.085 mol of hydroquinone, 0.085 mol of 3-aminophenol and 0.085 mol of the compound

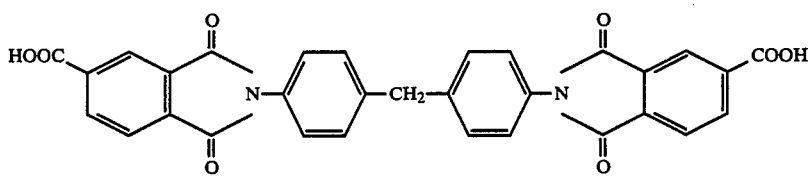

and 96 ml of acetic anhydride are heated with stirring under nitrogen from 150° C. to 300° C. in the course of 2 h 50 min, while excess acetic anhydride and acetic acid is distilled off. The pressure is then reduced to 40 mbar in the course of 20 min to give a viscous fiber-forming melt. The polymer melt and the cold polymer have a pearlescent luster. The polymer has a smooth, hard and abrasion-resistant surface. DSC differential scanning colorimetry measurements indicate a glass transition temperature of 181° C. The intrinsic viscosity is 0.37 dl/g, measured at 60° C. in a 0.5% strength (wt./vol.) solution in p-chlorophenol.

We claim:

1. A wholly aromatic mesomorphic polyester amide imide which forms a liquid-crystalline fiber-forming melt below 320° C., composed of (a) from 5 to 35 mole % of repeat units of the formula I or II or mixtures thereof

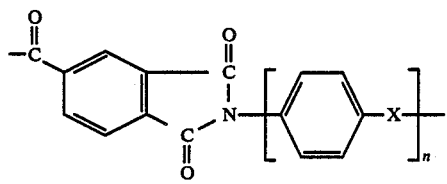
I

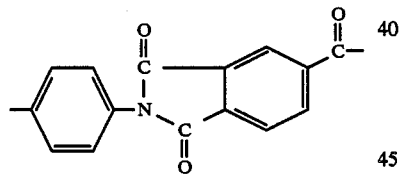
II

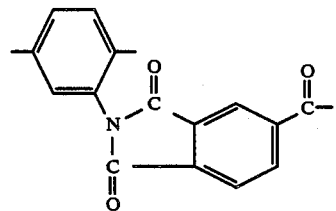

where the Xs in the formulae I and II are identical or different and each is —O—, —S—, —SO₂—, —CO—, —CH₂— or —C(CH₃)₂ and n is 0 or 1, (b) from 0 to 30 mole % of repeat units of the formulae III or IV or mixtures thereof

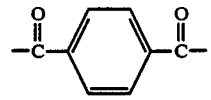
III

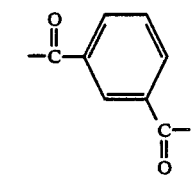
IV (c) a molar amount corresponding to the total amount of components a and b of repeat units of the formulae V, VI, VII or IX or mixtures thereof, with the stipulation that a molar quantity greater than zero of V, VI or mixtures thereof must be present at all times

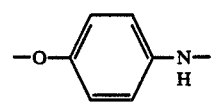
V

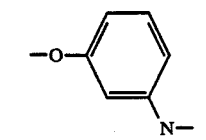
VI

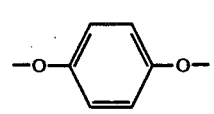
VII

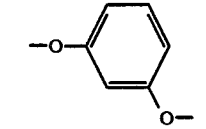
VIII

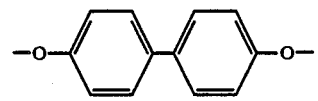
IX from 5 to 25 mole % of repeat units of the formula X, XI or XII or mixtures thereof:

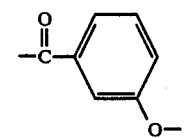
X

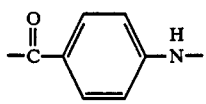

XI

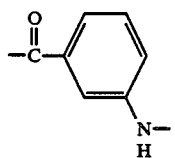

XII (e) repeat units of the formula XIII

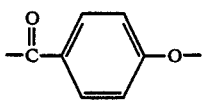

XIII the mole percentages of components (a), (b), (c), (d) and (e) adding up to 100 mole % in each case.

2. A wholly aromatic mesomorphic polyester amide imide as claimed in claim 1, composed of
(a) from 7 to 25 mole % of repeat units of the formulae I or II
(b) from 0 to 20 mole % of repeat units of the formulae III or IV
(c) a molar amount corresponding to the total amount of components (a) and (b) of repeat units of the formulae V, VI, VII, VIII or IX or mixtures thereof with the proviso that a molar quantity greater than zero of V, VI or mixtures thereof must be present at all times
(d) from 5 to 20 mole % of repeat units of the formulae X, XI or XII or mixtures thereof and
(e) repeat units of the formula XIII, the mole percentages of components (a), (b), (c), (d) and (e) adding up to 100 mole % in each case.

3. A wholly aromatic mesomorphic polyester amide imide as claimed in claim 1, which contains as component (c) from 5 to 20 mole % of repeat units of the formula VI or mixtures of 5 to 20 mole % of the repeat units of the formula VI and 2 to 8 mole % of repeat units of the formula V and from 5 to 20 mole % of one or more of the repeat units of the formulae VII, VIII or IX.

4. A wholly aromatic mesomorphic polyester amide imide as claimed in claim 1, which contains as component (c) from 5 to 20 mole % of repeat units of the formula VI and from 5 to 15 mole % of repeat units of the formula VII and also from 5 to 15 mole % of repeat units of the formula IX.

5. A wholly aromatic mesomorphic polyester amide imide as claimed in claim 1, which contains as component (c) from 5 to 20 mole % of repeat units of the formula VI and from 5 to 15 mole % of repeat units of the formula VII.

6. A wholly aromatic mesomorphic polyester amide imide as claimed in claim 1, which contains not less than 10 mole % of repeat units of the formula XIII.

7. A wholly aromatic mesomorphic polyester amide imide as claimed in claim 1, which has a glass transition temperature $T_g > 140°$ C.

8. A fiber from a polyester amide imide as claimed in claim 1.

9. A film from a polyester amide imide as claimed in claim 1.

10. A molding from a polyester amide imide as claimed in claim 1.

* * * * *